United States Patent [19]
Mills

[11] Patent Number: 5,917,338
[45] Date of Patent: Jun. 29, 1999

[54] AREA-EFFICIENT IMPLICATION CIRCUITS FOR VERY DENSE LUKASIEWICZ LOGIC ARRAYS

[75] Inventor: Jonathan W. Mills, Bloomington, Ind.

[73] Assignee: Indiana University, Bloomington, Ind.

[21] Appl. No.: 09/047,753

[22] Filed: Mar. 25, 1998

Related U.S. Application Data

[63] Continuation of application No. 08/783,196, Jan. 15, 1997, Pat. No. 5,770,966, which is a continuation of application No. 08/887,711, May 22, 1992, abandoned.

[51] Int. Cl.$^6$ .................................................. H03K 19/00
[52] U.S. Cl. .............................. 326/59; 326/35; 327/355
[58] Field of Search ................................ 326/35, 36, 119, 326/127, 133, 59; 327/215, 350, 355, 538, 543, 560, 568

[56] References Cited

U.S. PATENT DOCUMENTS

| | | | |
|---|---|---|---|
| 3,097,311 | 7/1963 | Tiemann | 326/135 |
| 3,116,426 | 12/1963 | Oshima et al. | 326/134 |
| 3,124,708 | 3/1964 | Reinecke, Jr. et al. | 326/133 |
| 3,239,687 | 3/1966 | Steele | 326/133 |
| 4,694,418 | 9/1987 | Ueno | 706/900 |

*Primary Examiner*—Terry D. Cunningham
*Attorney, Agent, or Firm*—Beck, Michael & Beck, P.C.

[57] ABSTRACT

A one-diode circuit for negated implication (∼→) is derived from a 12-transistor Lukasiewicz implication circuit (→). The derivation also yields an adjustable three-transistor implication circuit with maximum error less than 1% of full scale. Two Lukasiewicz logic arrays (£LAs) are proposed that use area-efficient implementations of the one-diode and three-transistor implication circuits. The very dense diode-tower £LA contains 36,000 implications in an area that previously held 92 implications; the three-transistor £LA contains 1,990 implications. Both £LAs double the number of inputs per pin on the IC package. Very dense £LAs make £LA-based fuzzy controllers and neural networks practical. As an example, an £LA retina that detects edges in 15 nanoseconds is described.

10 Claims, 23 Drawing Sheets

$(\alpha \supset \beta) \supset (\gamma \supset \delta)$

AREA-EFFICIENT IMPLICATION CIRCUITS FOR VERY DENSE LUKASIEWICZ LOGIC ARRAYS

CROSS-REFERENCE TO RELATED APPLICATIONS

This is a continuation of application Ser. No. 08/783,196, filed Jan. 15, 1997, now U.S. Pat. No. 5,770,966, which is a continuation of application Ser. No. 07/887,711, filed May 22, 1992, now abandoned.

FIELD OF THE INVENTION

This invention relates to analog logic circuits ad more specifically to logic circuits developed for implication and negated implication operations and applications thereof.

BACKGROUND OF THE INVENTION

Continuous-valued analog circuits for Lukasiewicz implication (→) and negated implication (∼→) are the basis for analog array processors called Lukasiewicz logic arrays (£LAs).

Lukasiewicz logic (hereafter £) has a denumerably infinite number of truth values. ($£_1$ is replaced by £ to avoid confusion when using $£_n$ to denote subsets of $£_1$). £ describes the class of ideal analog circuits that have an infinite maximum precision (see FIG. 1). Real analog circuits, which have a finite maximum precision, are classified by the number of data values encoded on individual wires in a circuit. A circuit is described by a subset of £ designated as $£_n$, where n specifies a whole number of truth values. $£_2$ is the most familiar subset of £: it includes the Boolean logic that describe binary digital circuits. Discrete multiple valued circuits are described by subsets of £ with $2 < n \leq 16$. Continuous-valued analog circuits are described by subsets of £ with $2 \leq n \leq 2^p$, where p is the maximum precision of the circuit in bits. Typically, p falls in the range $6 \leq p \leq 12$.

Continuous-valued analog £LAs have a dual logical and algebraic semantics that makes them capable of both symbolic and numeric computation. Fuzzy controllers, neural networks, inference engines and general-purpose analog computers (GPACs) can be implemented with £LAs.

An £LA is organized as an H-tree array that implements a sentence schema of £. The processing elements of the £LA correspond to implications or negated implications in the sentence schema. Three implication cells are shown in FIG. 2. Lukasiewicz implication is defined by the valuation function $v(\alpha \to \beta) = \min(1, 1 - \alpha + \beta)$ and represented by the symbol "→" or °. Negated implication has a valuation function defined as $v(\alpha \sim\to \beta) = \max(0, \alpha - \beta)$ and represented by the symbol "∼→" or ⋽. Negated implication is identical to bounded difference (Θ), but indicates its relation to implication: $\sim\to \equiv \sim(\alpha \to \beta)$. The term implication is occasionally used to refer to both functions.

Applications for Lukasiewicz logic arrays include fuzzy controllers, neural networks, tautology checkers for £, and general-purpose analog computers (GPACs). Arithmetic and logical functions can be defined using implication or negated implication. A specific processor can be constructed by mapping arithmetic and logical functions with varied precision to one or more £LAs.

Analog computers of the 1950's and 1960's used diodes to build special function generators. However, the link between these special function generators an Lukasiewicz logic was not recognized, although Wilkinson described an "analog diode logic" that corresponds with Lukasiewicz logic in an IEEE Transactions on Electronic Computers article in April of 1963. Corver Mead's innovations in analog VLSI for neural systems, the use of Lukasiewicz logic as a foundation for approximate reasoning systems, and the advent of practical £LAs point to the renewed growth of analog computing after a 30-year hiatus.

Architectures for these applications cannot be implemented with known prototype £LAs, which contain too few implication circuits. The Achernar £LA compiler (available from the Computer Science Department of Indiana University in Bloomington, Ind.) typically outputs sentences containing hundreds of implications, with many internal and few external connections. £L9, a prototype £LA, has only 32 implications per chip. Practical architectures built with £LAs require at least 1,000 implication circuits on a chip. £LAs of this density can be built with the area-efficient implication and negated implication circuits described in this application.

SUMMARY OF THE INVENTION

An area-efficient analog logic circuit according to one aspect of the present invention comprises a first diode having an anode and a cathode, and a second diode having an anode and a cathode wherein said cathode of said first diode is connected to said anode of said second diode, and wherein said anode of said first diode is an input node for two current signals, said cathode of said second diode is an input node for two current signals, and a negated implication logic signal is produced at said cathode of said first diode.

One object of the present invention is to provide an improved device and method for analog logic circuits.

Another object of the present invention is to provide a more compact circuit for implementing analog logic circuits.

A further object of the present invention is to provide a circuit that is manufacturable in silicon wafer form to provide a silicon retina with very small pixel size.

Yet another object of the present invention is to simplify known analog logic circuits to reduce the integrated circuit real estate required to manufacture the devices in silicon.

Still another object of the present invention is to provide implication and negated implication analog logic circuits in small enough form to enable implementation of multitudes of known algebraic or mathematical functions in a single integrated circuit.

These and other objects of the present invention will become more apparent from the following description of the preferred embodiment.

BRIEF DESCRIPTION OF THE DRAWINGS

FIG. 6b is the resulting schematic for the implication cell of FIG. 6a when the shaded portions are eliminated from FIG. 6a.

FIG. 12b is a fully detailed electrical schematic of the implication pair circuit of FIG. 12a.

FIG. 14b depicts a plan view of a metal ground plane used to cover the innermost devices of FIG. 14a.

FIG. 17b is a schematic showing buffers added to the input and output of the schematic of FIG. 17a.

DESCRIPTION OF THE PREFERRED EMBODIMENT

Figure 1:
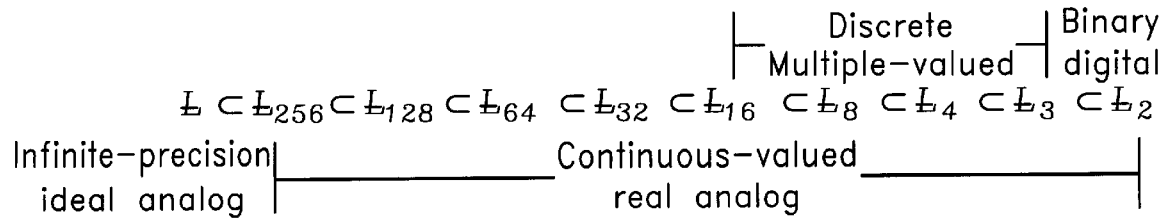
FIG. 1 is a diagramatic representation of the relationship between binary, discrete multiple-valued and continuous valued real analog logic systems.
Figure 2:
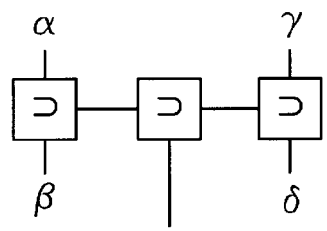
FIG. 2 is an H-tree array of implication cells.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 10A:
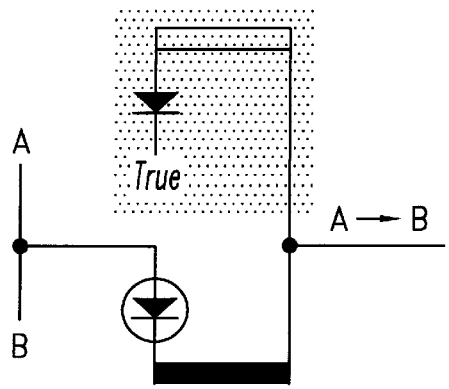
FIG. 10a is an electrical schematic of a two transistor implication circuit.

Two implication circuits are disclosed. The first is a one-diode negated implication circuit (see FIG. 12). The second is a three-transistor implication circuit (see FIG. 10). Both circuits are derived from a 12-transistor Lukasiewicz implication circuit shown in FIG. 3a (the £L9 implication prototype). Two Lukasiewicz logic arrays (£LAs) are proposed that use area-efficient implementations of the one-diode and three-transistor implication circuits. A diode tower (FIG. 15) is introduced to implement very dense £LAs in VLSI. It is a three-dimensional VLSI structure composed of a vertically-stacked pair of Schottky-diode negated-implication circuits.

The diode-tower and three-transistor £LAs contain more implications than previous £LAs. The diode-tower £LA is estimated to contain 36,000 implications in a $1800\mu \times 2000\mu$ region, the area of a MOSIS "Tiny" chip. Using the £L9 implication cell the same area contains a maximum of 92 implications. The diode-tower £LA is as accurate as the £L9, the prototype £LA that used the 12-transistor implication circuit shown in FIG. 3a.

The three-transistor £LA can be fabricated using nMOS current mirrors alone. The resulting array is less dense than the diode-tower £LA, but does not require the special IC process technology needed to fabricate diode towers. The three-transistor £LA contains a maximum of 1,990 implications in an $1800\mu \times 2000\mu$ area, and is more accurate than £L9.

Figure 10B:
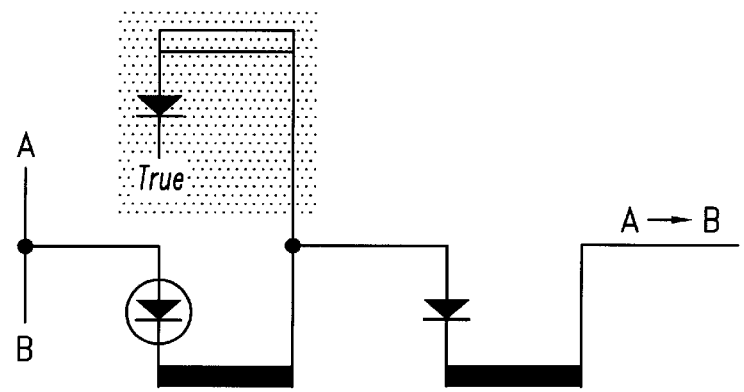
FIG. 10b is an electrical schematic of the circuit of FIG. 10a with a current sink added to the output.

Both £LAs have the additional advantage that array inputs are the difference of two currents (shown as "A-B" and "C-D" in FIGS. 10 and 12). This enables two input values for each input pin on the £LA integrated circuit package. However, even with twice the number of input values, £LAs are pin-limited devices. Application architectures must have numerous internal connections to fully utilize very dense £LAs.

Figure 3A:
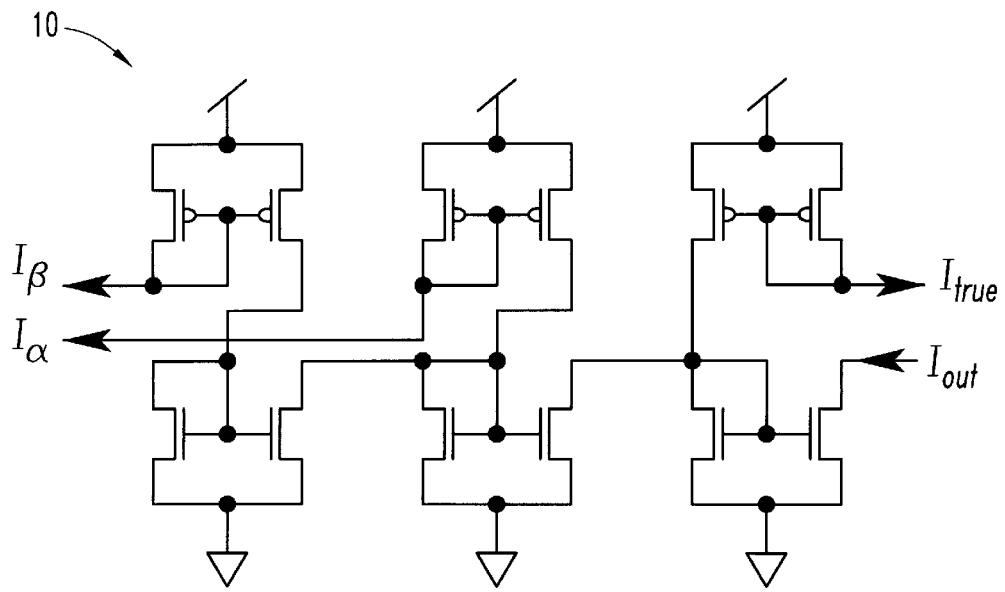
FIG. 3a is schematic of a twelve transistor implication circuit or cell.
Figure 3B:
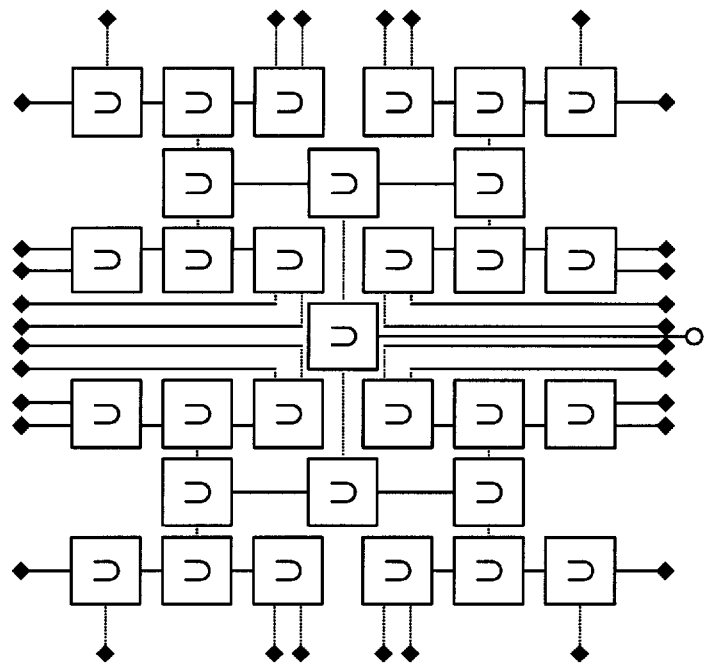
FIG. 3b is an arrangement or array of 32 implication cells.

Referring now to FIG. 3a, a £L9 Lukasiewicz implication cell 10 is shown. Circuit 10 is based on an earlier design that implemented negation and implication using Yamakawa's basic fuzzy logic cell disclosed in U.S. Pat. No. 4,716,540. The earlier Yamakawa design is simplified in £L9 to an implication cell with buffered input currents $I_\beta$ and $I_\alpha$. $I_{true}$ is a predetermined reference current represented a true state or value and $I_{out}$ is the output signal current from circuit 10. One £L9 array contains 32 implication cells (see FIG. 3b). Negation is programmed at the circuit's inputs by replacing the expression ~$\alpha$ with the equivalent expression $\alpha \rightarrow F$.

Figure 4:
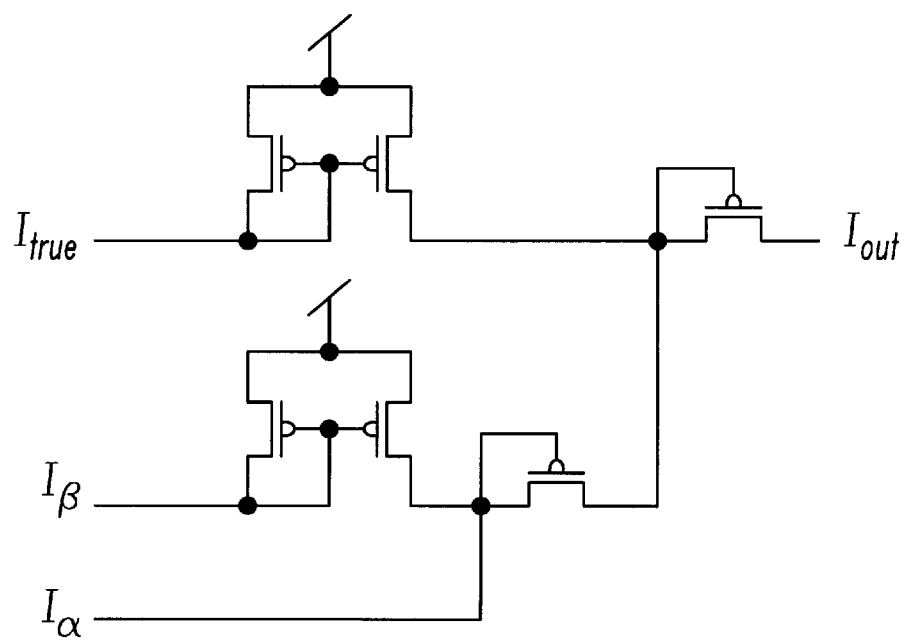
FIG. 4 is a schematic of a six transistor implication cell circuit.

The 12-transistor implication cell of FIG. 3a is unnecessarily complex compared to Yamakawa's six-transistor implication cell (FIG. 4). However, a three-transistor implication cell and a one-diode negated implication cell (equivalent to Yamakawa's three-transistor bounded difference circuit) can be derived from the 12-transistor cell by removing redundant input buffers, and pairing implications in the array.

Figure 5A:
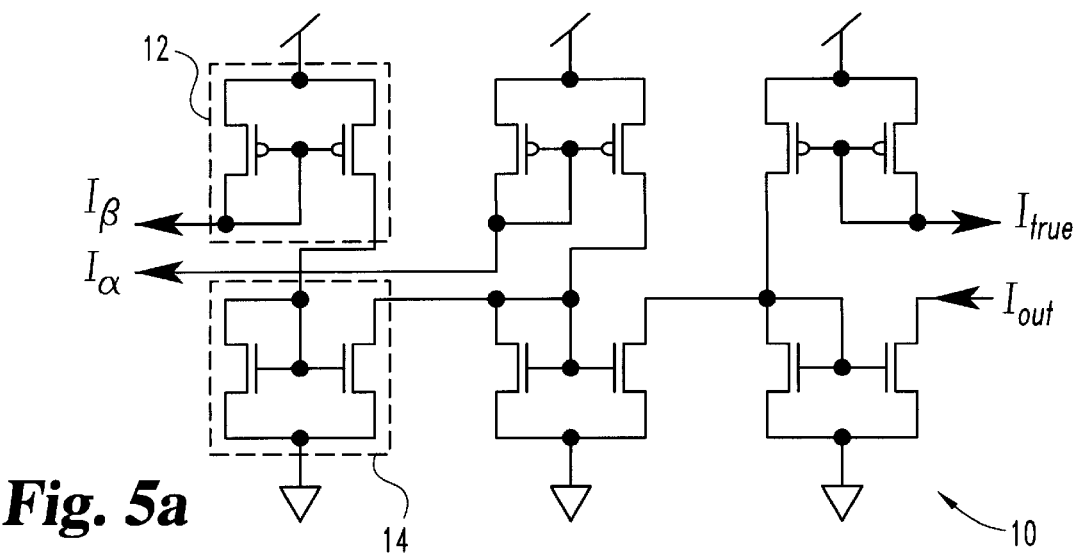
FIG. 5a is schematic of a twelve transistor implication circuit or cell.
Figure 5B:
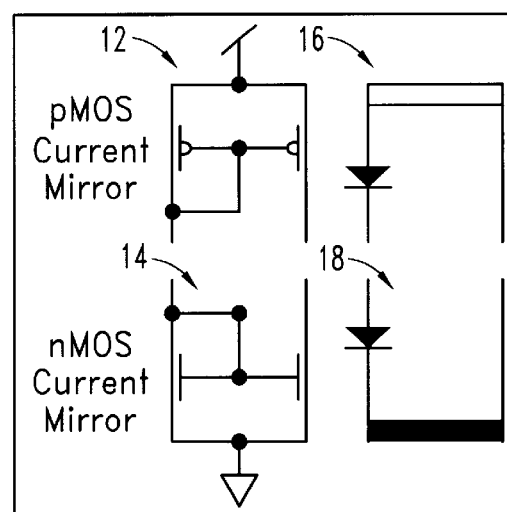
FIG. 5b is an electrical schematic of current mirror devices and their symbolic equivalents used in the Figures of this application.
Figure 5C:
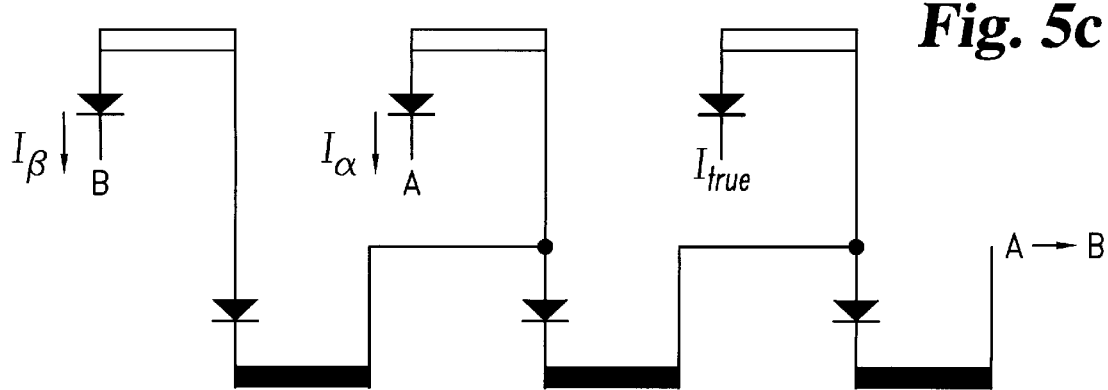
FIG. 5c is the circuit of FIG. 5a redrawn with the symbolic equivalents defined in FIG. 5b.

Substitute schematic symbols (shown in FIG. 5b) are used to illustrate the derivation of the three-transistor and one-diode implication cells or circuits. The symbols simplify the schematic of £L9 implication (FIG. 5a). The pMOS and current mirror 12 and the nMOS current mirror 14 of FIG. 5a are represented by U-shaped boxes 16 and 18 respectively, indicating their function as either current sources or current sinks as shown in FIG. 5b. An open bar at the top, like the bubble indicating a p-transistor, indicates a pMOS current mirror. A solid bar at the bottom indicates an nMOS current mirror. Diode-connected MOS transistors are indicated by a traditional diode symbol. The resulting schematic for the £L9 implication clearly shows its structure and operation (FIG. 5c). The letter "A" represents input current $I_\alpha$, the letter "B" represents input current $I_\beta$ and $I_{out}$ is represented symbolically by "A-B" (A implies B).

Figure 6A:
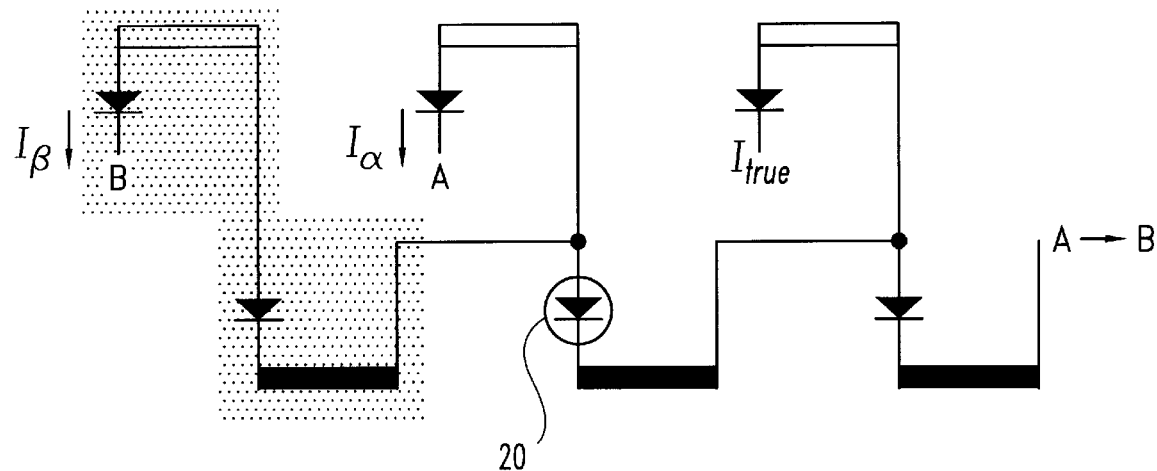
FIG. 6a is an electrical schematic of the twelve transistor implication cell showing the portions of the circuit that may be eliminated since buffering is not necessary.
Figure 6B:
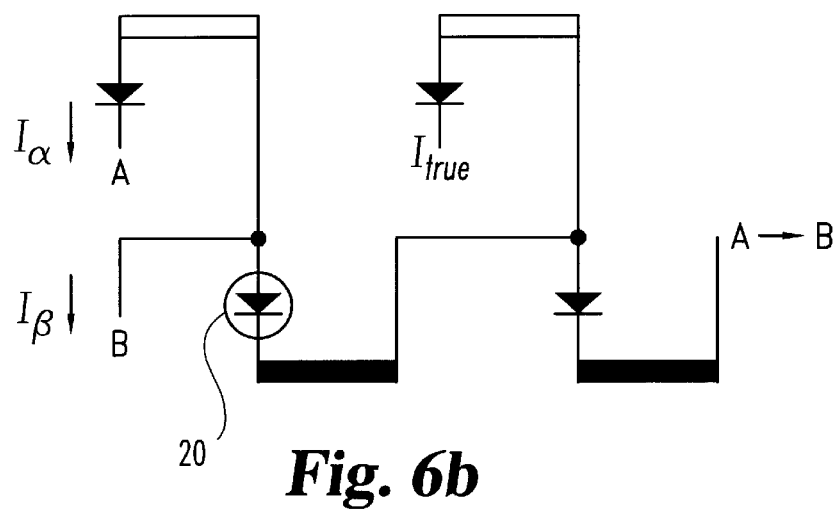

£L9 buffers the $I_\beta$ input current before it is subtracted from the buffered α input current (FIG. 6a, shaded). Buffering the $I_\beta$ input in a binary tree array is redundant since no cell output drives more than one input. The current mirror buffers for $I_\beta$ also limit the value of $I_\beta$ to the interval between 0 and the $I_{true}$ reference. This is unnecessary since the diode-connected MOSFET 20 (FIG. 6a) keeps $I_\alpha-I_\beta$ a positive current value. The current difference $I_\alpha-I_\beta$ will fall within the interval if the input currents $I_\alpha$ and $I_\beta$ lie in the interval. Given this constraint, the $I_\beta$ current-mirror buffers (shaded in FIG. 6a) can be safely removed to yield an eight-transistor implication circuit (FIG. 6).

The α input of the eight-transistor implication circuit is mirrored only to invert the direction of the current flow, allowing implication cells to be connected into an array. However, pairing a current source for an $I_\alpha$ current with a current sink for an $I_\beta$ current in the array removes the need for the $I_\alpha$ input current mirror. The implication cells can then be simplified as a pair.

Figure 7A:
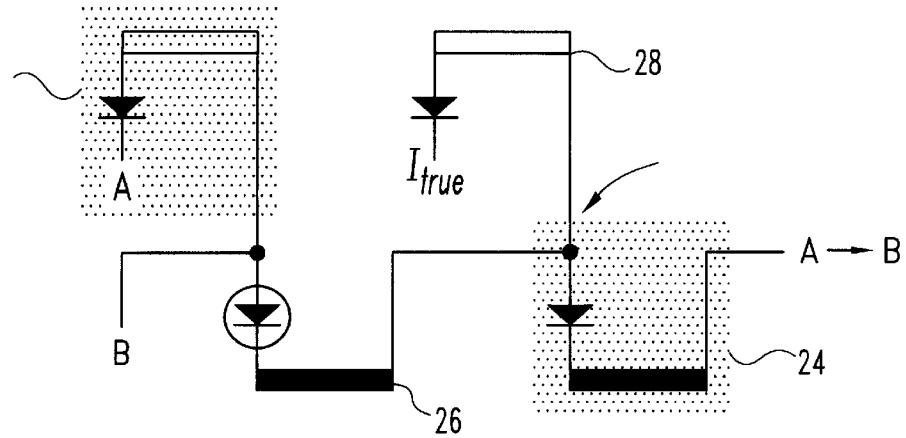
FIG. 7a is a schematic diagram depicting additional portions of the implication circuit that may be deleted.
Figure 7B:
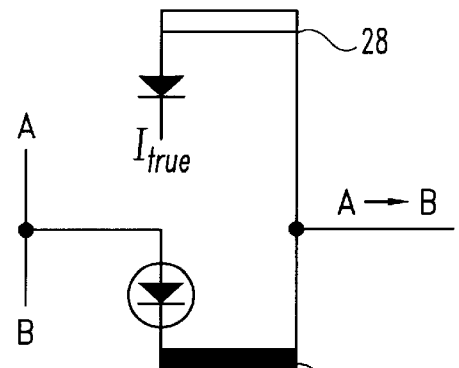
FIG. 7b is the resulting implication circuit of FIG. 7a once the shaded portions of FIG. 7a are deleted.
Figure 7C:
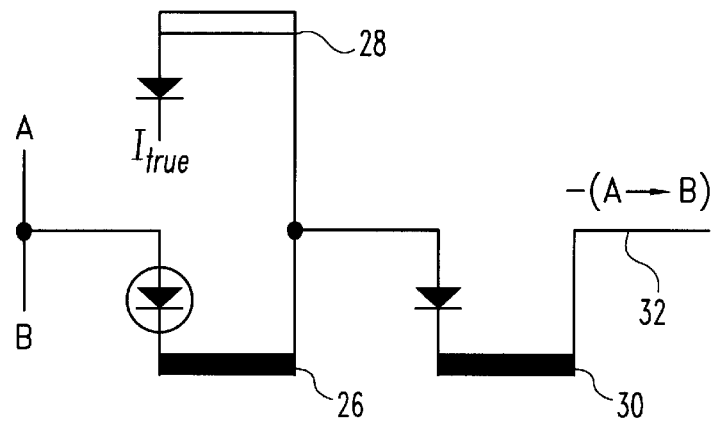
FIG. 7c is an electrical schematic of the implication cell of FIG. 7b with an inverting current sink added to the output.

Referring to FIGS. 7a–c, the current source output mode cell of the implication pair is derived by eliminating the $I_\alpha$ input current mirror 27 and the current mirror 24 that provides a current sink at the output. Thus, the output of the cell is the sum of the currents produced by current sink 26 and current source 28 (FIG. 7b). The variable output current of the cell comes from current sink 26 (FIG. 7b). A current sink cell 30 is added to provide or produce ~(A→B) at the output 32 of the implication pair. The output of the cell is thus a current sink (FIG. 7c).

In both cells of FIGS. 7a and 7b the circled diode-connected MOSFET computes max(0, α-β). At the node pointed to by the arrow in FIG. 7a true-max(0, $I_\alpha-I_\beta$) is computed according to Kirchoff's Law. Because $I_\alpha$ and $I_\beta$ are constrained to lie in the interval [0,1] this is equivalent to min(true, $I_{true}-I_\alpha+I_\beta$), or min(true, true-A+B), or min(1, 1-A+B), the valuation function for implication.

Figure 8:
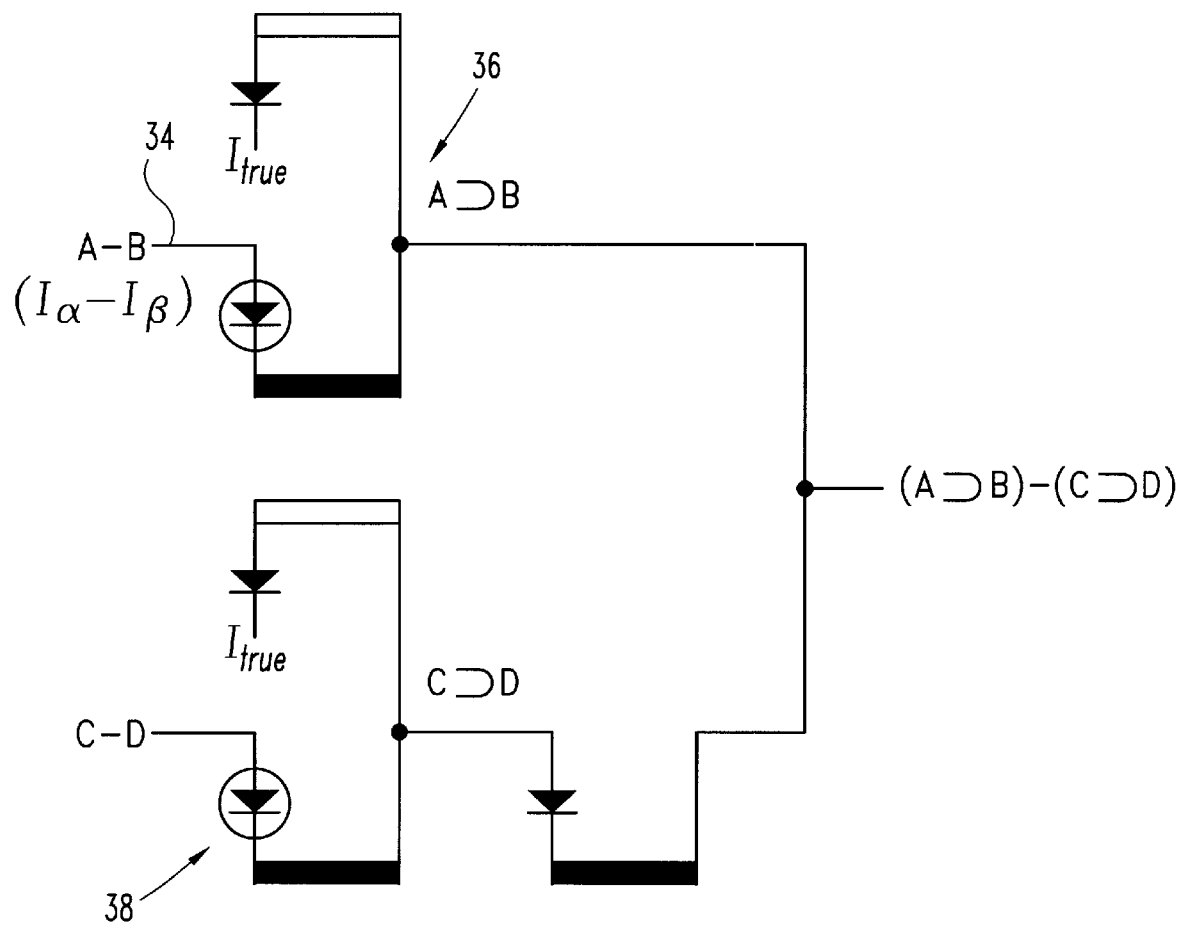
FIG. 8 is a schematic of an implication pair circuit.

In FIG. 8 the current-source and current-sink cells next are combined into an implication pair. Within the array, the output of one child implication pair (not shown) is connected to an input 24 of the parent implication 36 pair by a single wire. The wire carries a current whose value is $I_\alpha-I_\beta$, where $I_\alpha$ is the output current of the child's current-source cell and $I_\beta$ is the output of the child's current-sink cell (not shown). The remaining half of the implication pair 38 is identical with the circuit of FIG. 7c.

Figure 9:
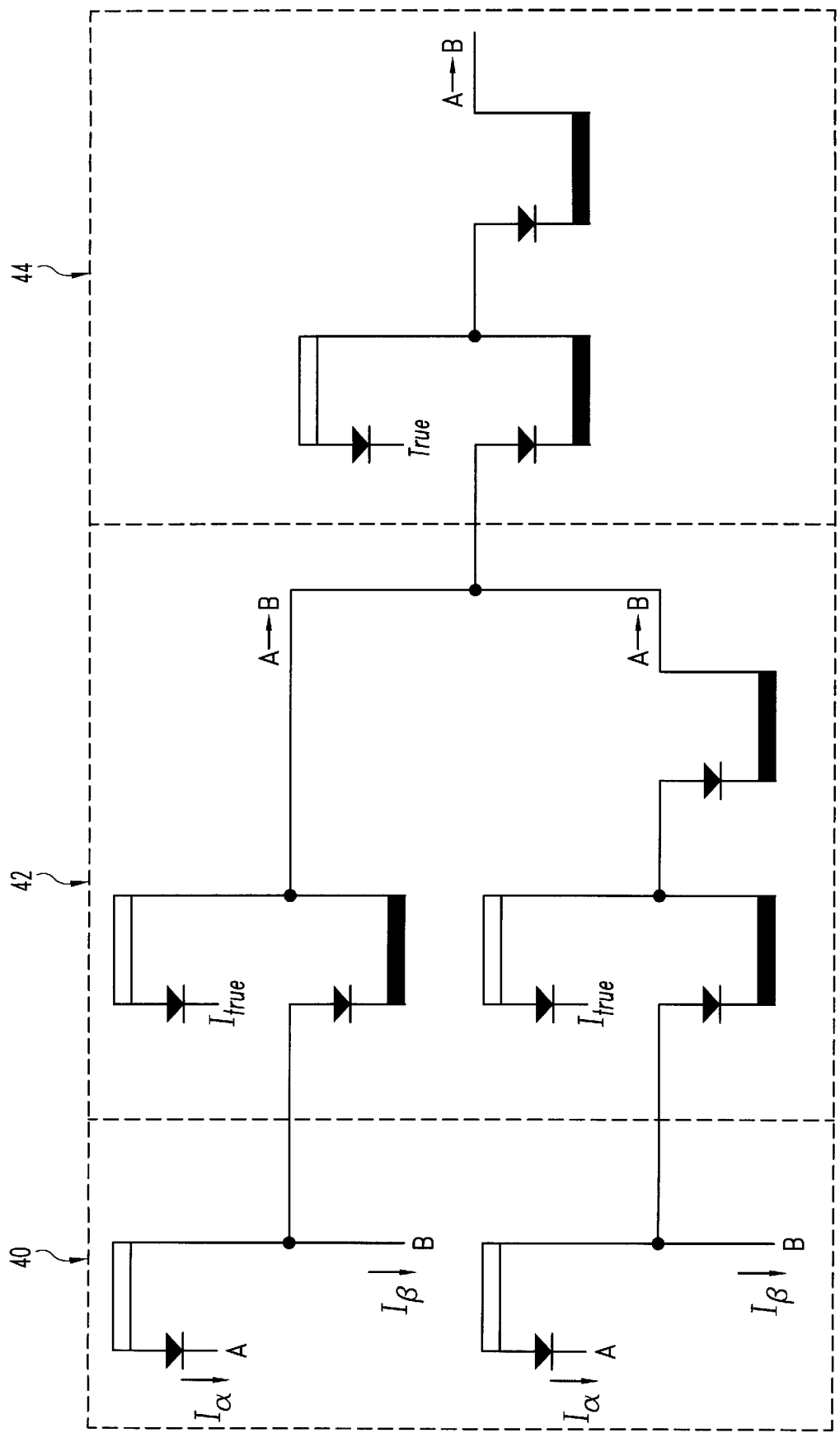
FIG. 9 is a schematic of the input cells, interior nodes and root output circuitry of an £LA built from implication pairs.

£LAs built from implication pairs have three internal components: input cells 40, interior paired implication cells 42, and a root cell 44 whose output is a current-sink cell (see FIG. 9). Input cells 40 at the leaves of the array are driven by current sinks. The $I_\beta$ input is a current sink, but the $I_\alpha$ input must be inverted with a current-mirror to provide a current source. Interior nodes of the binary tree are composed of paired implication cells 42. The root output 44 is a current sink implication cell and its output is used directly. When cascading £LAs, the difference between the outputs of two lower-level £LAs is computed by the input cell of the next-higher £LA.

Figure 10C:
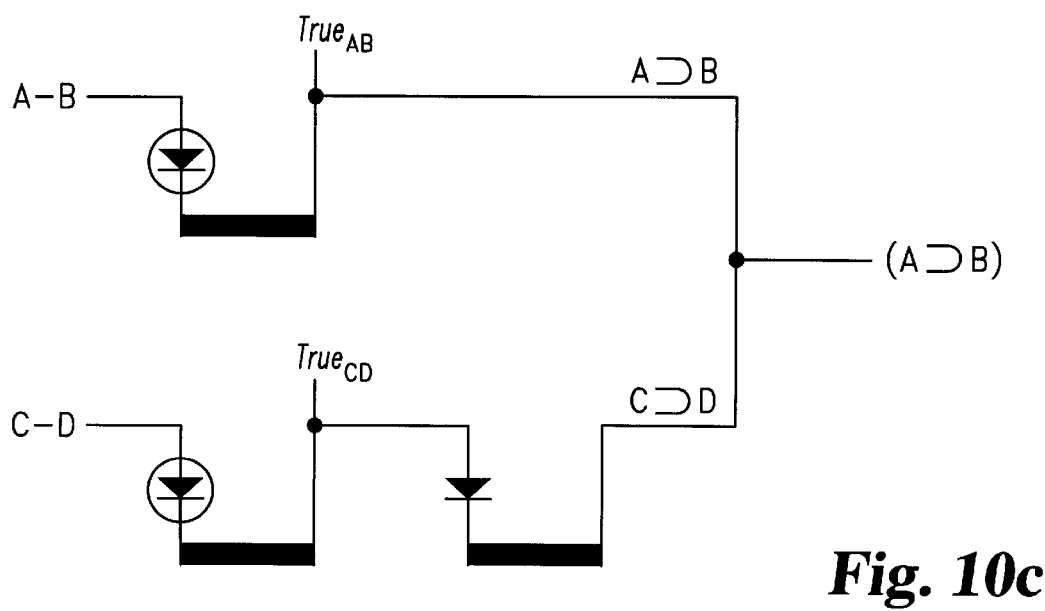
FIG. 10c is an electrical schematic of an implication pair circuit.

The five transistor implication cell can be reduced to a three-transistor cell by removing the $I_{true}$ reference current-mirror buffers (FIGS. 10a and b, shaded) to arrive at the circuit of FIG. 10c. The $I_{true}$ reference currents are generated by other current mirrors elsewhere on the £LA. The $I_{true}$ current mirrors must be implemented with pMOS current mirrors to provide current source outputs instead of a current sink output.

The $I_{true}$ reference currents are used to adjust the output value or range of the paired implication cell. The reference current-mirror array is separated into one array of true references for the current source cells and another array for the current sink cells. Each array is driven by a separate external input. Adjusting these inputs with respect to each other changes the location of the minimal error in each quadrant of the circuit's output. Such an adjustment can be used to compute functions with improved accuracy, although the precision of the circuit is unchanged.

The implication cell can be reduced to a single diode by transforming it to a negated implication cell. In this process, two-transistor and one-transistor negated implication cells are described. All active elements of the implication pair except the diode-connected MOSFET are removed, which is replaced by one diode.

Figure 11A:
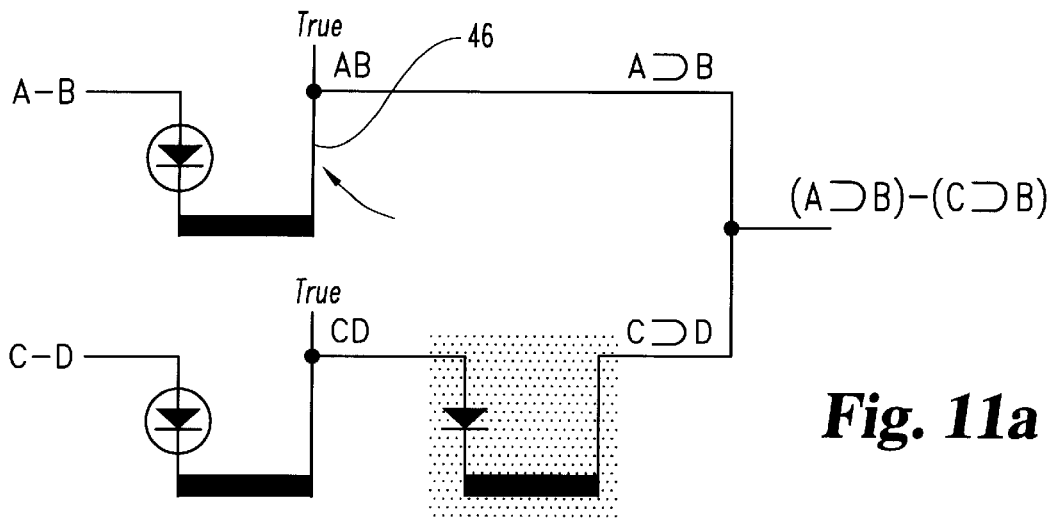
FIG. 11a is an electrical schematic of the implication pair circuit showing the shaded current sink as a removable item.
Figure 11B:
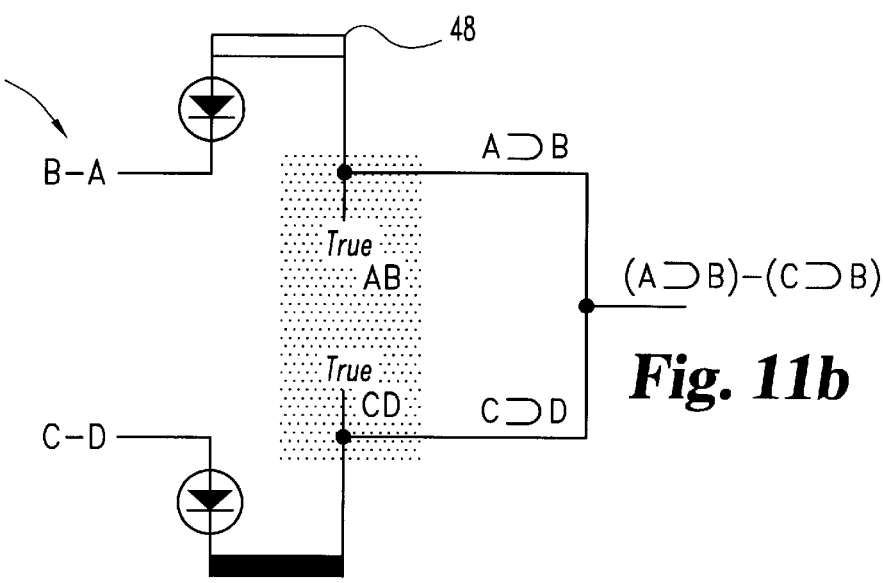
FIG. 11b is the redrawn schematic of FIG. 11a with the current sink removed.
Figure 11C:
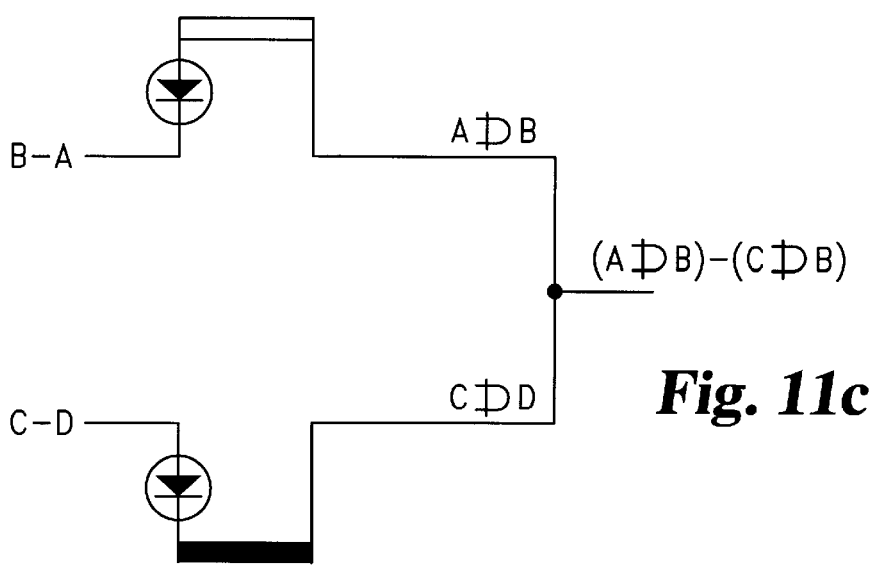
FIG. 11c is an electrical schematic of the implication pair of FIG. 11b.

The first step in the transformation is to remove the current sink in the current-sink cell (FIG. 11a, shaded). Next, the sign of the true reference current is changed. To accomplish this the current-source cell is "inverted" by changing the nMOS current mirror 46 to a pMOS current mirror 48, and the true reference current to a current sink (FIGS. 11a and 11b). The sign of the α and β inputs (A and B) must be reversed to preserve the computation of min(true, true-α+β) (FIG. 11b, location 50). The true reference currents are removed because their signs are opposite; they subtract out according to Kirchoff's current Law (FIG. 11b, shaded). A pair of two-transistor negated implication cells remain (FIG. 11c). Each cell computes max(0, A-B) or max(0, C-D).

Figure 12A:
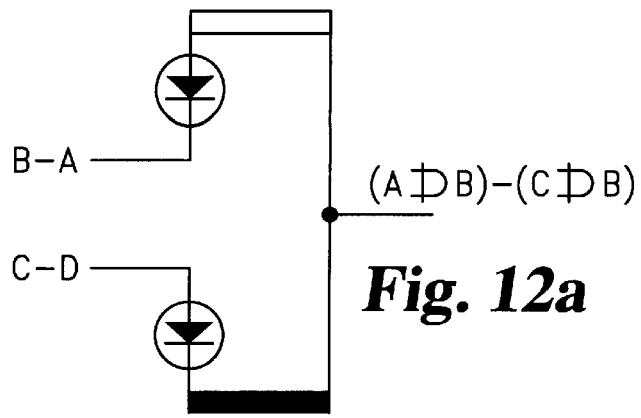
FIG. 12a is an electrical schematic of an implication pair circuit.
Figure 12B:
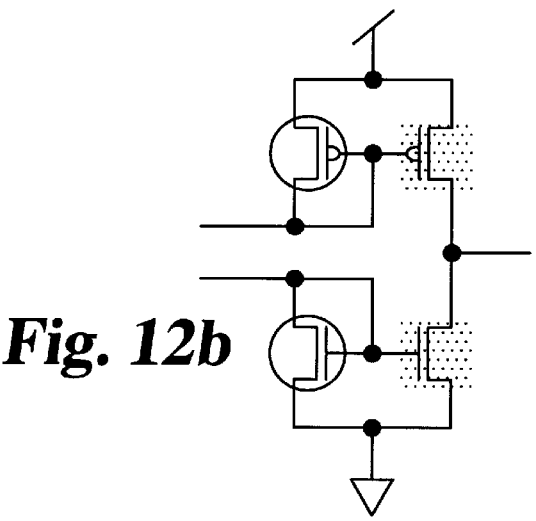
Figure 12C:
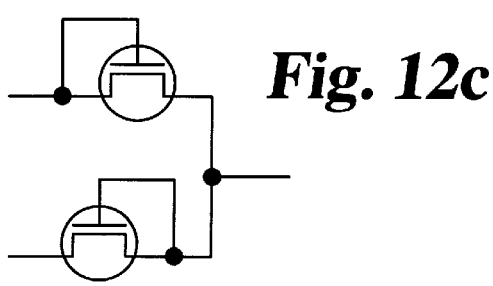
FIG. 12c is a one diode implication circuit paired with another one diode implication circuit and shown as a MOS diode connected transistor.
Figure 12D:
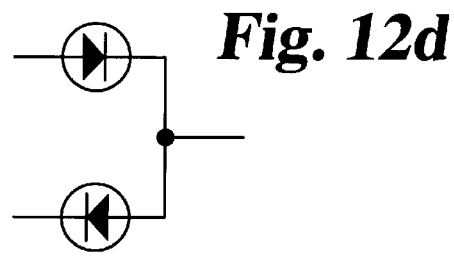
FIG. 12d is an electrical schematic of the circuit of FIG. 12c with traditional diode symbols substituted therefore.

The simplified schematic is expanded to show the derivation of the one-diode implication circuit (FIG. 12a is equivalent to FIG. 12b). The transistors that implement the current source and current sink outputs (FIG. 12b, shaded) are not needed if the output voltage is sufficient to forward-bias the next diode-connected MOSFET in the array. (If not, the voltage can be restored by inserting a buffer). Thus, each current mirror can be replaced by a diode-connected MOSFET (FIG. 12c). Substituting a p-n junction diode or a Schottky diode for the diode-connected MOSFET yields the one-diode implication cell (FIG. 12d).

The results of simulating the £L9, the three-transistor, and the one-diode implication cells are shown. Level 3 of Spice is used because it most closely matches the measurements obtained from £L9. All simulations use the MOSIS process parameters for the £L9 fabrication run.

Figure 13A:
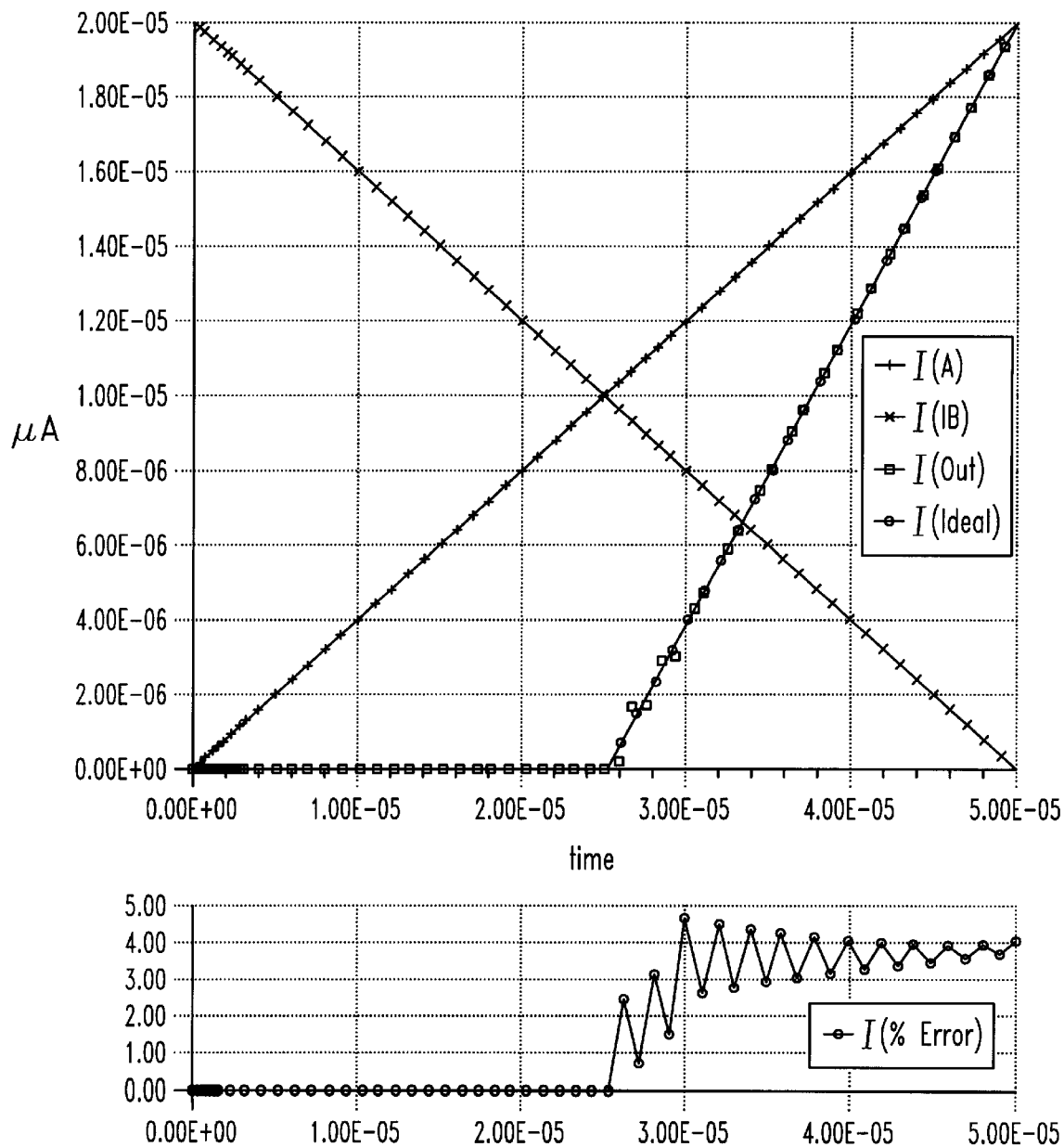
FIGS. 13a, 13b, 13c and 13d are graphs of simulated circuit responses detailing the input verus output response or characteristics of several disclosed circuits.
Figure 13B:
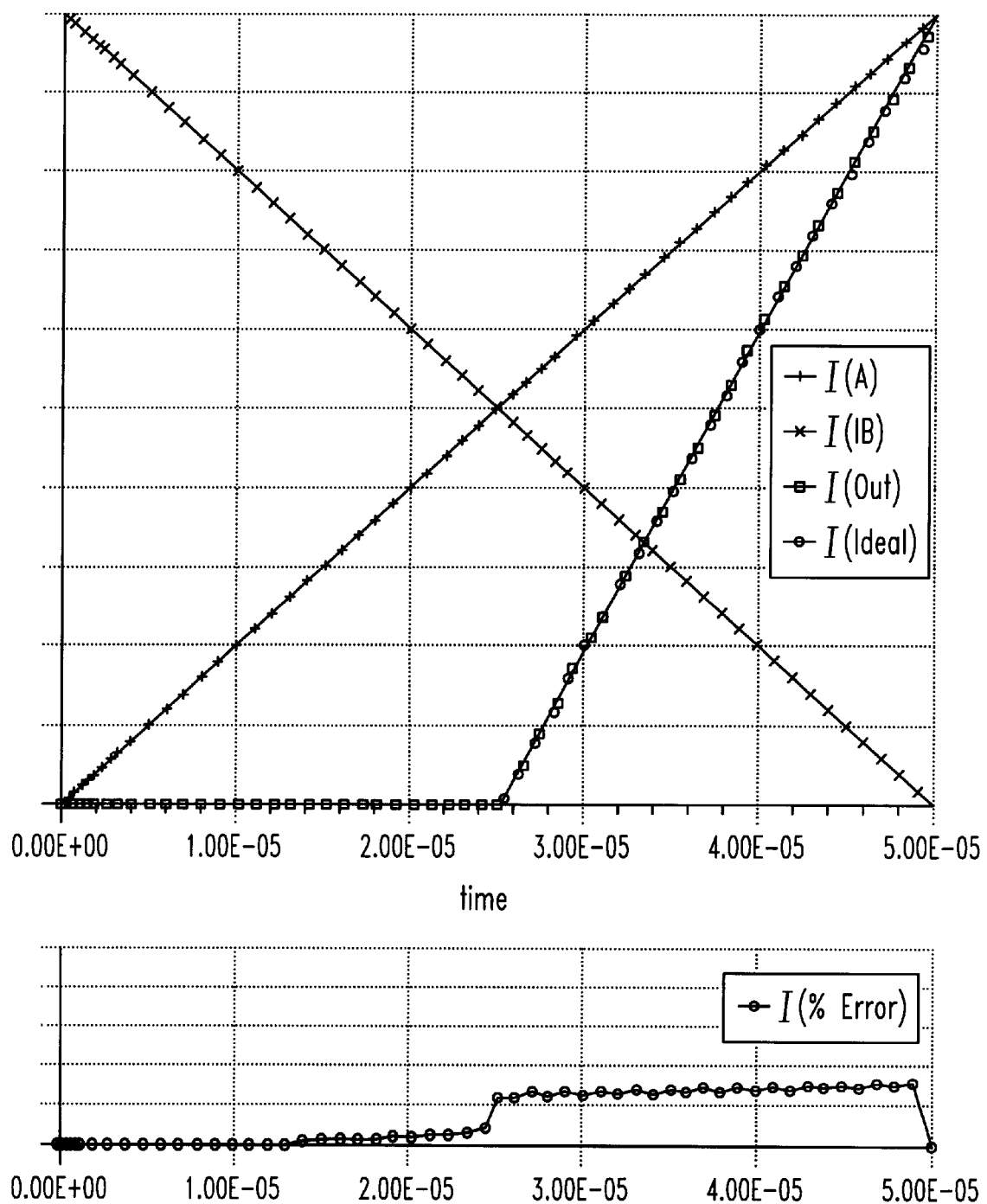
Figure 13C:
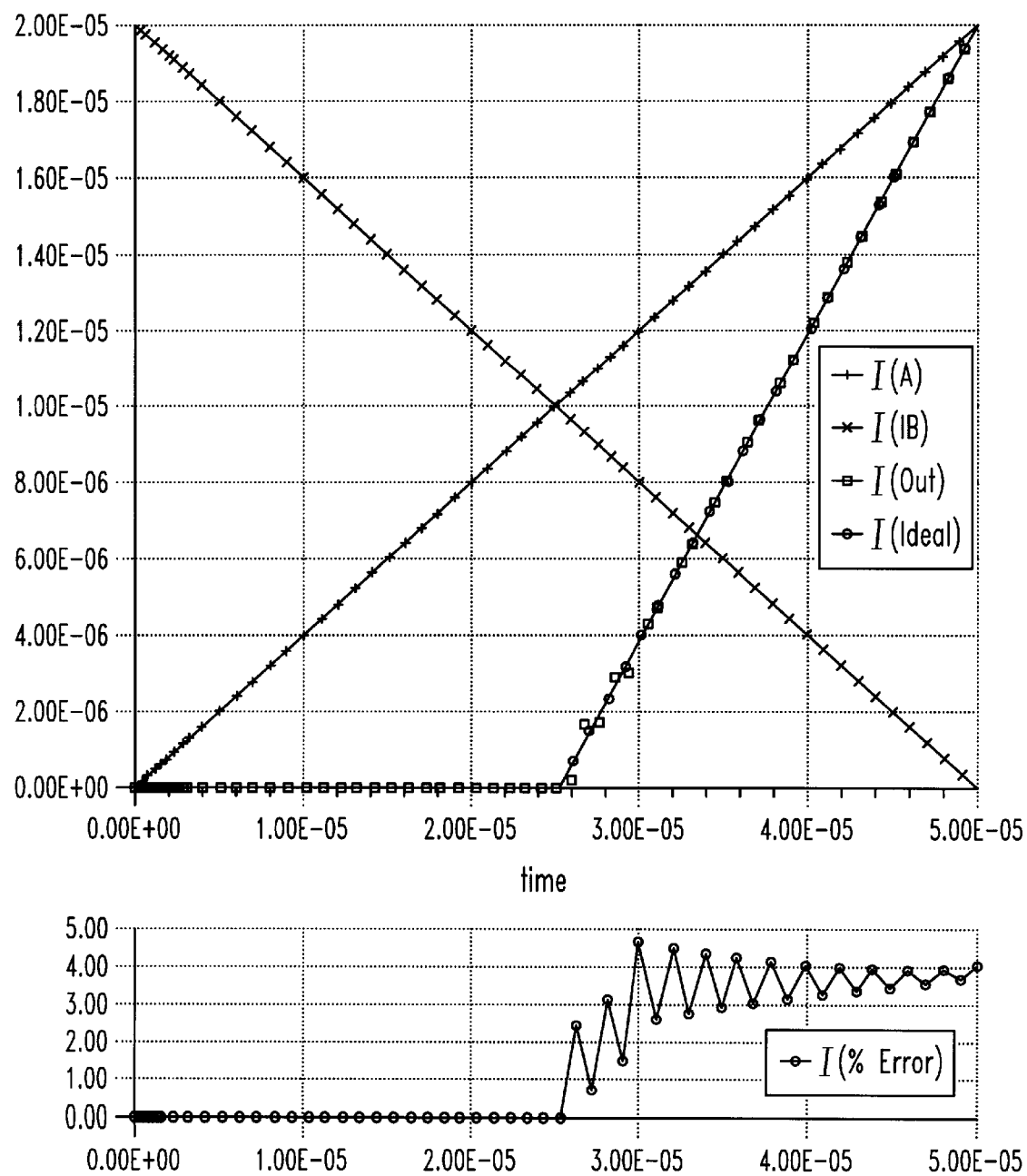
Figure 13D:
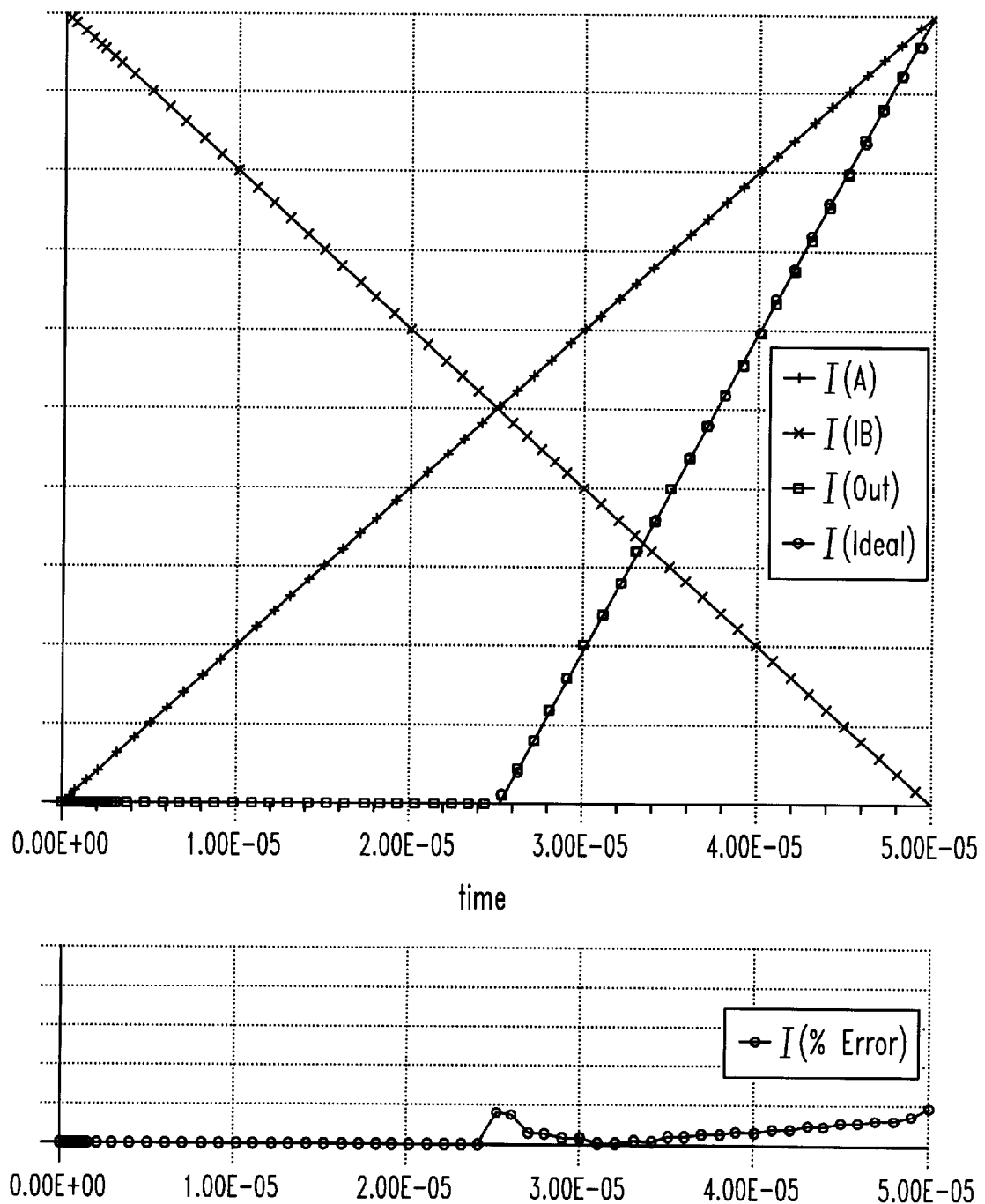

Referring to FIGS. 13a–d, the "half-notch" function is simulated. It is defined by the expression ~(α→~α). The maximum error of the £L9 simulation is near 5% (FIGS. 13a and 13c), which is greater than the 4% error of an untrimmed £L9. The one-diode implication cell has a maximum error of 1.5% (FIG. 13b). The three-transistor implication cell has a maximum error of 0.8% (FIG. 13d). The smaller error in the one-diode implication cell is probably due to fewer active components, which reduce the noise in the cell's output. The three-transistor cell uses the true reference inputs to trim the cell's output. Varying the trim inputs is equivalent to varying the gain ratio between the current-source and current-sink implication cells in each pair, which reduces the error in the output.

Measurements of £L9 show that its typical error is less than 2%, with a mean error less than 0.5%. This suggests that the results of simulating the three-transistor and the one-diode implication cells are plausible.

Two new £LAs are proposed in this paper. The first is a trimmable £LA based on the three-transistor implication cell. It is referred to as the three-transistor £LA and is similar to the prototype £LA of FIG. 11a. The second is a very dense £LA based on a one-diode negated implication. The negated implication circuits are implemented in pairs, using two Schottky diodes stacked vertically. Such a three-dimensional VLSI structure is called a diode tower, so the £LA incorporating it is referred to as a diode-tower £LA.

Figure 14A:
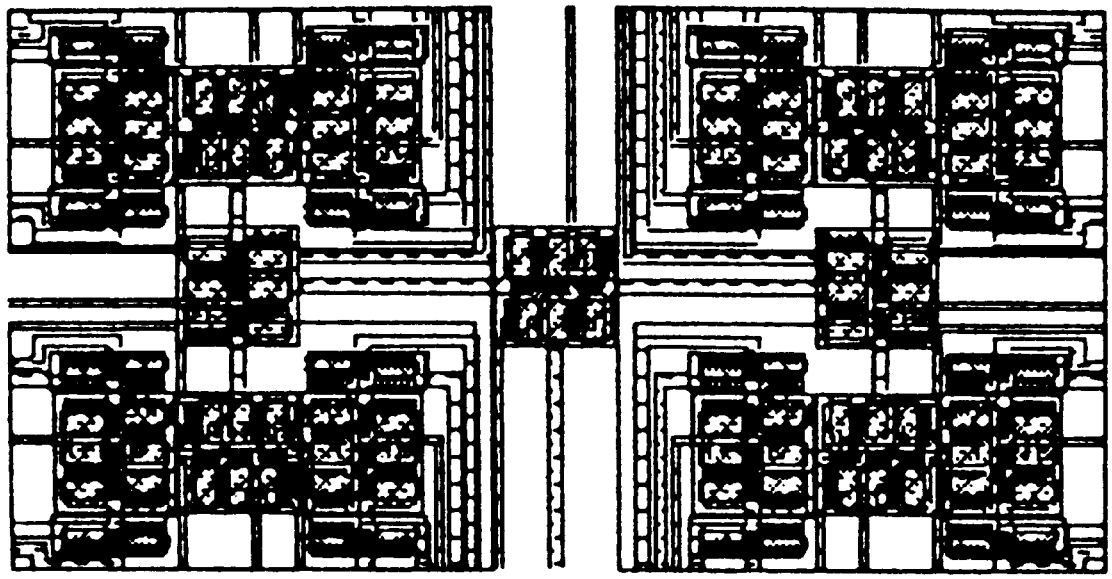
FIG. 14a is an integrated circuit plan view or layout of the 31-cell Lukasiewicz Logic implication cells.
Figure 14B:
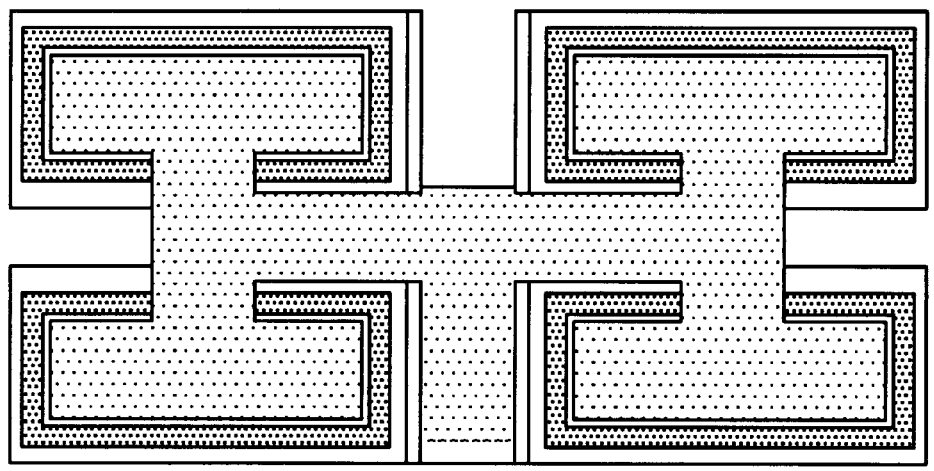

The three-transistor £LA is smaller than £L9 because it contains fewer transistors, and because those transistors are the same type. Because only nMOS transistors are used, no area is wasted to separate p-wells and n-wells internally. The pMOS current mirrors in the leaf input cells and the $I_{true}$ reference current mirror array are placed around the edge of the £LA. The nMOS current mirrors are grouped in the interior and root nodes (FIG. 14a). The electrical isolation and heat dissipation of the £LA is improved by covering the pMOS devices with a metal2 $V_{dd}$ plane; the nMOS devices are covered with a metal2 GND plane (FIG. 14b).

The three-dimensional VLSI structure, the diode tower (see FIG. 15), is proposed to implement very dense £LAs. A diode tower is a vertically-oriented one-diode implication pair embedded in a silicon dioxide matrix. Diode towers can be constructed from p-n or Schottky diodes. P-n diode towers can be fabricated using three-dimensional silicon-on-insulator process technology, which has already been developed for MOSFETs. P-n diode towers are prevented from becoming avalanche diodes by the central output connection of the diode tower. Diode towers can also be fabricated using bulk CMOS processes by intentionally building Schottky diodes, the normally unwanted devices that result when metal directly contacts the diffusion layer.

Figure 15:
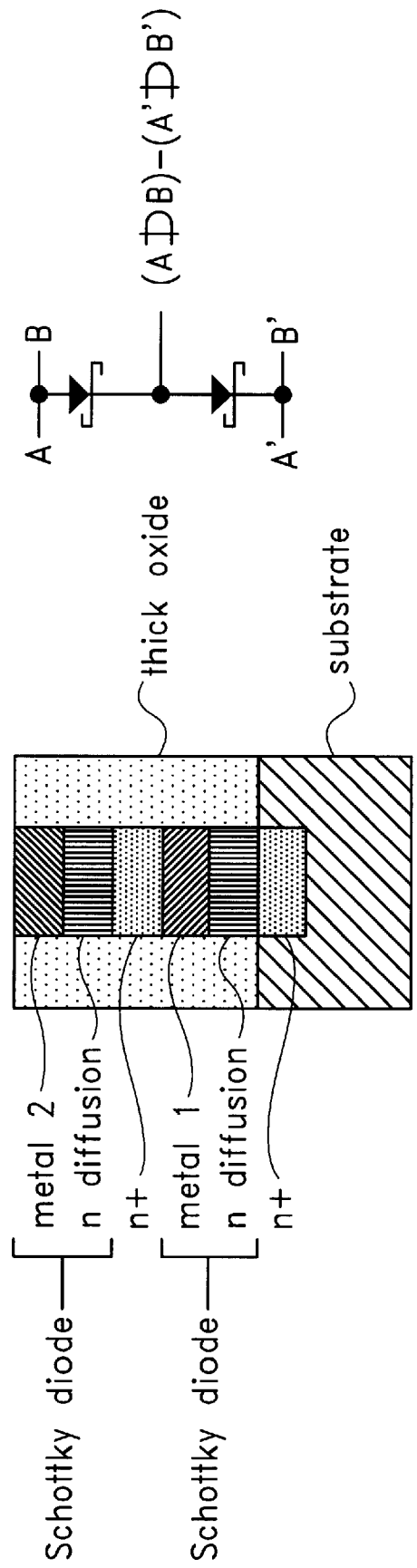
FIG. 15 is a cross-section of the integrated circuit construction of a diode tower along with the corresponding electrical schematic for the diode tower.

In the proposed Schottky diode tower, the metal-diffusion contacts are not disabled by a layer of heavily-implanted $n^+$ diffusion, except where an ohmic connection is desired between the diodes in the diode tower (FIG. 15). The integral metal layers in the Schottky diodes are extended as global routing planes. $N^+$ diffusion locally connects buried contacts in the substrate.

Figure 16A:
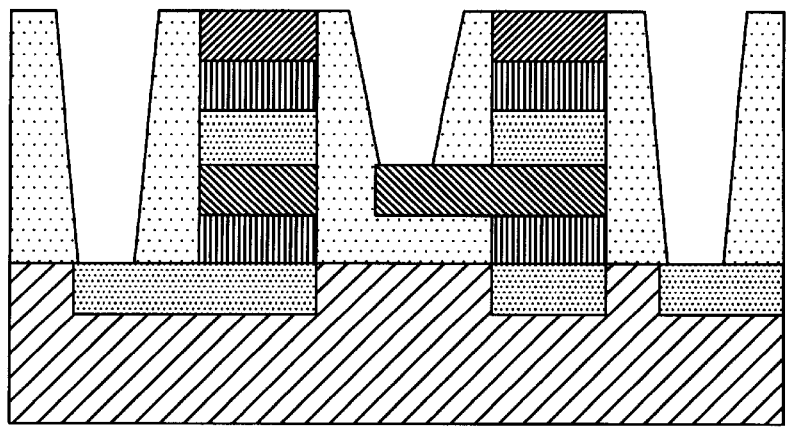
FIG. 16a is a cross-section of a diode tower detailing N+ diffusion locally connecting varied contacts in the substrate.
Figure 16B:
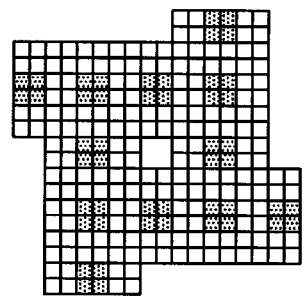
FIG. 16b shows a proposed plan view arrangement of the diode towers of FIG. 15 in an integrated circuit.
Figure 16C:
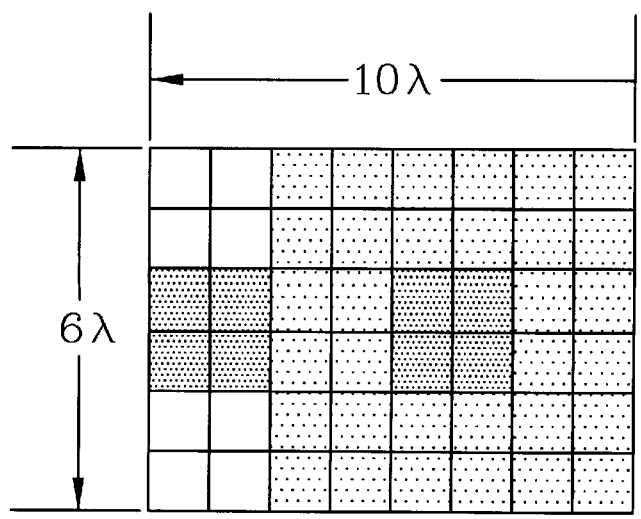
FIG. 16c details the tiled or arrayed diode towers in a 6×10 arrangement.

Using diode towers standard-cell £LAs can be designed as a sea of implications. These devices bring contacts for connections between cells to the surface of the £LA and leave them open for routing at a later time (FIG. 16a). One diode-tower (two implication cells) can be constructed within a $6 \times 10 \lambda^2$ area (FIG. 16c) and tiled or arranged as shown to give four diode towers (eight implications) per $14\lambda^2$ (FIG. 16b). In this configuration a $2\mu$ process would fit a maximum of 36,000 implications into a MOSIS "Tiny" chip, and approximately $1.3 \times 10^6$ implications into a one $cm^2$ die. This is the equivalent of $10^4$ fuzzy rules or algebraic functions.

Figure 17A:
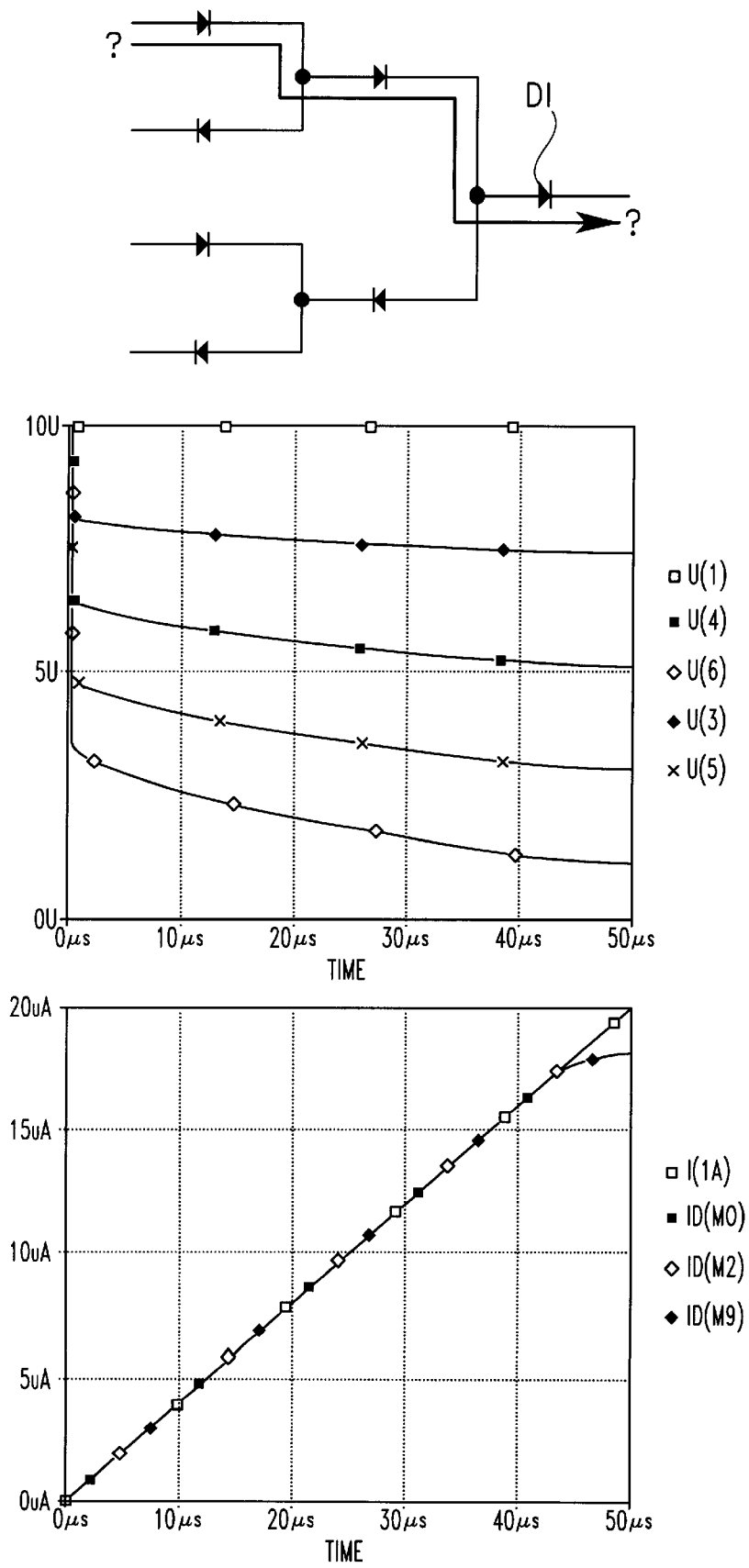
FIG. 17a is an electrical schematic detailing the diode drops encountered in an implication array.
Figure 17B:
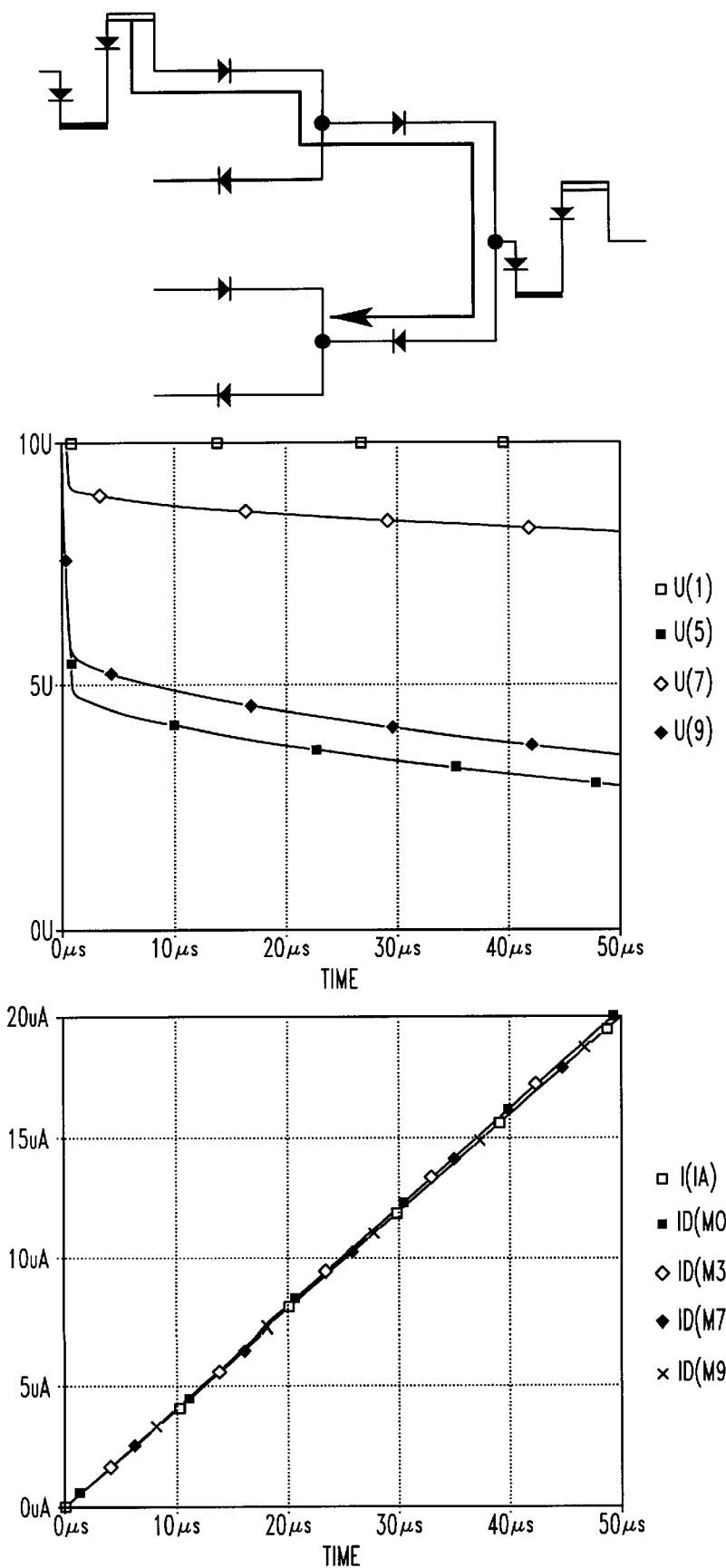

The one-diode negated implication circuit has the disadvantage that the voltage drop across successive diodes in a chain will be insufficient to forward-bias the last diode D1 in the chain (FIG. 17a). Current-mirror buffers, similar to buffers in digital logic, must be inserted to prevent this from occurring (FIG. 17b). A buffer is needed after ever three diode connected MOSFETs, which have a voltage drop of 1.2 volts, or every 10 to 15 Schottky diodes, which have a voltage drop of 0.25 volts.

Diode-tower and three-transistor £LAs are denser than previous designs. In an $1800\mu \times 2000\mu$ area the diode-tower £LA contains 36,000 implications, while the three-transistor £LA contains 1,990 implications. Only 92 12-transistor implications fit into the same area. Table 1 summarizes the improvements.

TABLE 1

| | | Optimization of £LAs | | | |
|---|---|---|---|---|---|
| Cell type, number £LA | | Function of components | Area of 31 | Maximum implications cell array2 | "Tiny" chip |
| 1 cm2 area | | | | | |
| L9 | stand-alone MOSFET, 6 pTrans + 6 nTrans | α→β | $888\mu \times 1366\mu$ (A→B) | 92 | 2,550 |
| £A-3FET | Cascoded MOSFET 3 nTrans | α→β (A→B) | $170\mu \times 329\mu$ | 1,990 | 55,400 |
| £A-D-3d proposed | Cascoded diode tower, 1 Schottky diode | ~α→β ~(A→B) | $48\mu \times 48\mu$ | 36,000 | 1,300,000 |

An advantage of three-transistor £LAs is that they can be fabricated using nMOS current mirrors alone. The resulting array is less dense than the diode tower array, but functions more accurately. Trim inputs can be adjusted to reduce error to less than 1% of full scale. This £LA is more accurate than the prototype £L9 because its output can be trimmed using independent positive and negative reference currents.

Both £LAs have the advantage that the number of inputs is twice the number of input pins on the package. This is because each input is the difference of two currents, which can be computed externally and carried on a single wire.

Figure 18:
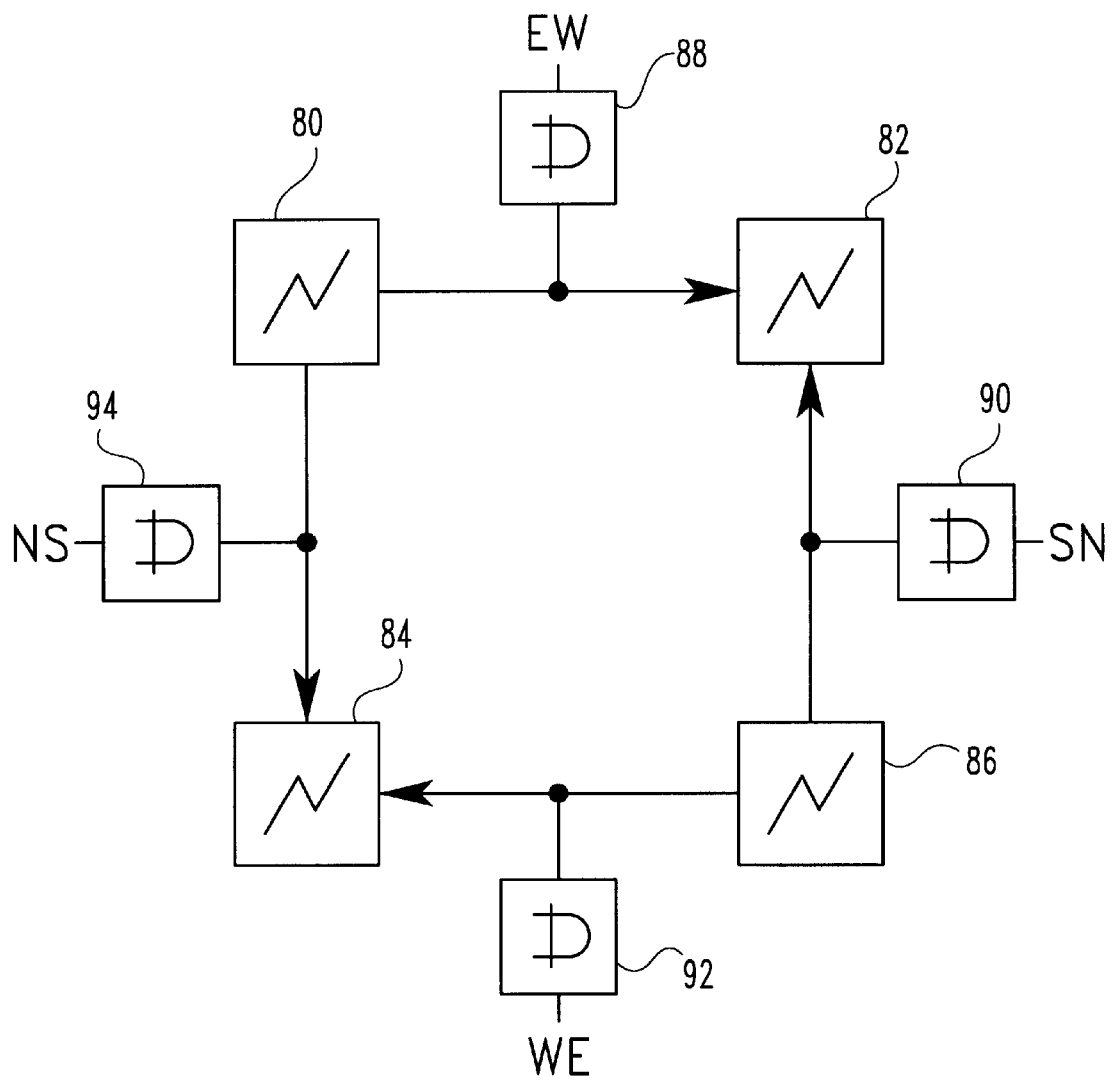
FIG. 18 is a diagramatic representation of a 4-pixel electronic retina.

A prototype VLSI retina was designed using £LAs. The VLSI retina uses one negated implication as a fuzzy directed-edge sensor in a four-pixel photo-sensor cluster (FIG. 18). Photo-sensor clusters are arrayed to form the retina. The £LA retina is 20 times less complex and several orders of magnitude faster than Mead's retina, but does not exhibit its exact biological response.

Figure 19:
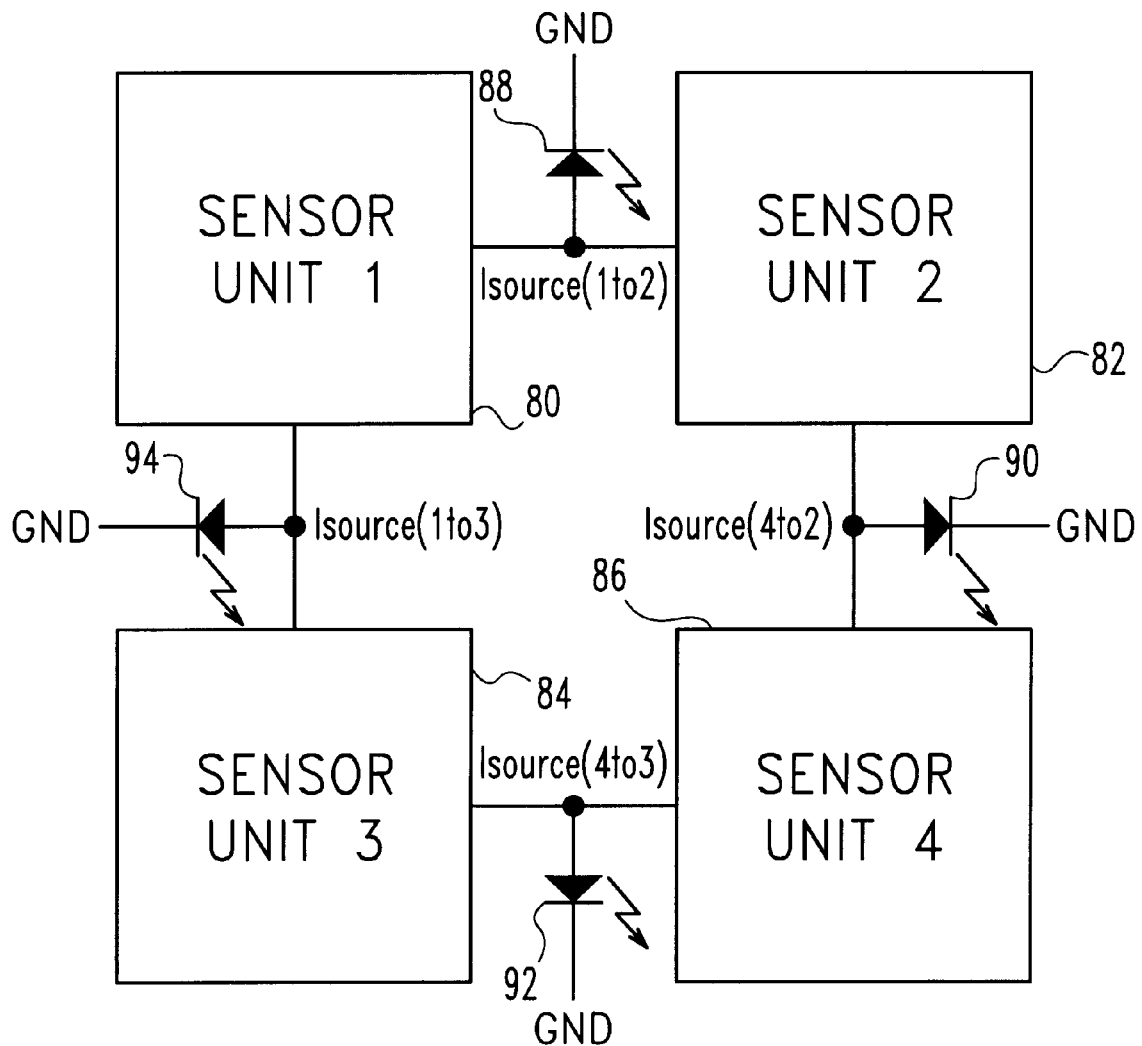
FIG. 19 is a block diagram of a 4-pixel retina of FIG. 18.
Figure 20A:
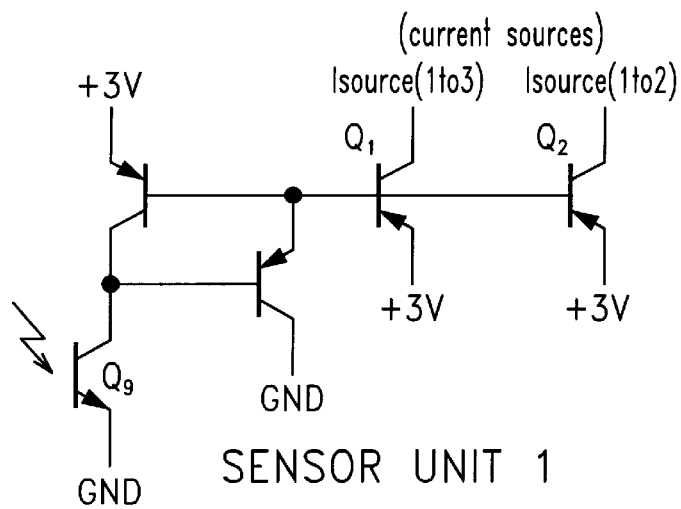
FIGS. 20a–20d are the electrical schematics of the Sensor Units shown in FIG. 19.
Figure 20B:
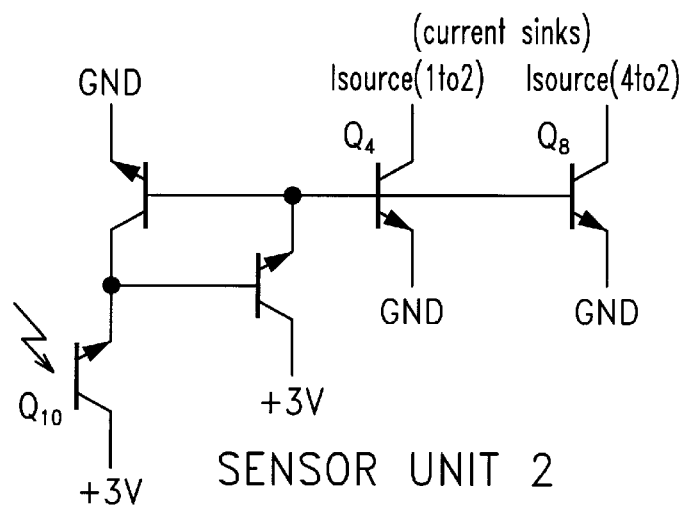
Figure 20C:
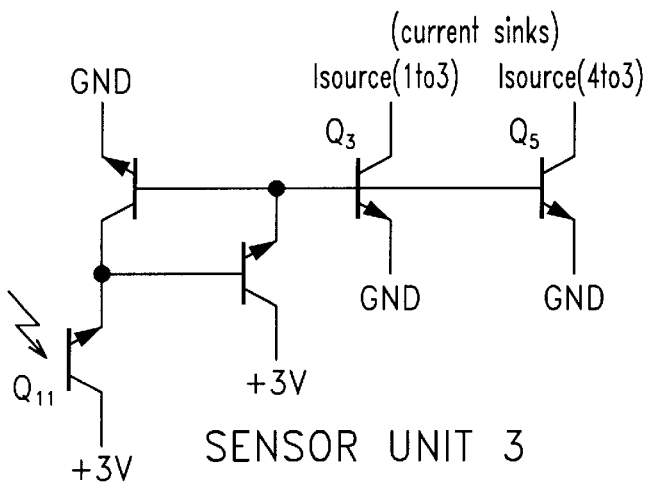
Figure 20D:
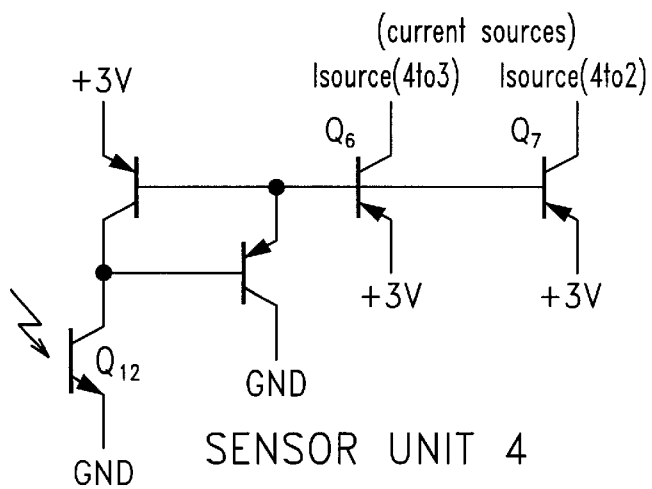

Referring now to FIG. 19, an embodiment of the four pixal silicon retina of FIG. 18 is shown. Sensor units 1–4 labeled 80, 82, 84 and 86 correspond with the similarly identified sensor units in FIG. 18. LED 88 functions as the negated implication cell 88 in FIG. 18. Similarly, LEDs 90, 92 and 94 correspond with their respectfully labeled negated implication cells in FIG. 18.

Operationally speaking, the difference in current between adjacent connected sensor units in FIG. 19 provides a current signal to activate a corresponding LED situated between the adjacent Sensor Units. The LEDs, of course, function as negated implication cells. Evaluation according to the negated implication evaluation function (max(0, $\alpha-\beta$)) provides a result wherein an imbalance of the source current from Sensor Unit 1 (80) in comparison with the current sink circuit of Sensor Unit 3 (84) will forward bias and illuminate LED 94. Specifically, if Sensor Unit 3 (84) is unable to sink all of the current from Sensor Unit 1, then LED 94 is illuminated. Sensor unit 1 sources current in the connection between Sensor Unit 1 and Sensor Unit 2. Similarly, Sensor Unit 4 is a source of current for the connections between itself and Sensor Unit 2 as well as Sensor Unit 3. Sensor Unit 2 and Sensor Unit 3 are current sink circuits. Additionally, each of the Sensor Units 80, 82, 84 and 86 include a photo transistor sensitive to light. Activation of the photo transistor causes a disturbance or variation in the current source/sink balance between adjacent Sensor Units.

The schematic diagrams shown in FIGS. 20a–d provide detailed circuitry describing the componentry within each of the Sensor Units in FIG. 19. Sensor unit 1 (shown in FIG. 20a) includes two current sources transistors Q1 and Q2. The collector of transistor Q1 is the current source between Sensor Units 1 and 3, and is connected to the collector of transistor Q3 in FIG. 20c. The collector of transistor Q2 is connected to the collector of transistor Q4 in FIG. 20b. Likewise, the collectors of transistors Q5 and Q6 are connected. The collectors of transistors Q7 and Q8 are connected, and the collectors of transistors Q2 and Q4 are connected. Thus, each of the Sensor Units is connected or wired to its adjacent Sensor Unit to establish a current source/sink relationship. When light impinges upon some of the photo transistors, Q9–Q12, an imbalance is created between the current sources and the current sinks and the excess or difference in current is passed through the corresponding LEDs (88, 90, 92 and 94) thereby indicating illumination differentials among the photo-transistors. Edge detection is the objective of the 4-pixal electronic retina cell shown in FIGS. 18–20. When the currents of Sensor Unit 3 or Sensor Unit 2 are unable to sink the current sourced by the current sources of Sensor Units 1 or 4, then the LED or negated implication cell between the corresponding Sensor Units is illuminated. For example, when Sensor Unit 2 is unable to sink the current supplied by Sensor Units 1 and 4, LEDs 88 and 90 will illuminate. This would indicate that Sensor Unit 2 is occluded from light, that transistor Q10 has turned off, and the voltage at the bases of transistors Q4 and Q8 has dropped below that voltage necessary to sink the current sourced by the current source Q2 and current source Q7. The indication is that Sensor Unit 2 is obscured from light. Edge detection is indicated as existing between Sensor Unit 1 and Sensor Unit 2 as well as between Sensor Unit 4 and Sensor Unit 2. Similar results are obtained by occluding Sensor Unit 3 (84) or in combination any of the adjacent Sensor Unit. For example, if Sensor Unit 3 and Sensor Unit 1 are occluded from light, then LED 92 will be illuminated since Sensor Unit 3 will no longer have the capability to sink the current produced by transistor Q6 of Sensor Unit 4. LED 94 will not be illuminated since neither Sensor Unit 1 nor Sensor Unit 3 will source or sink current. Sensor unit 2 will not be illuminated because Sensor Unit 1, specifically transistor Q2, is unable to source as much current as transistor Q4 is able to sink. Thus, no current is available to flow to ground through LED 88.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A negated implication analog logic circuit comprising:
   a first diode having an anode defining a first circuit input and a cathode;
   a second diode having an anode connected to said cathode of said first diode and defining a circuit output thereat, and a cathode defining a second circuit input;
   a first composite analog signal applied to said first circuit input, said first composite analog signal including a first number of having continuous values within a first specified range analog signals; and
   a second composite analog signal applied to said second circuit input, said second composite analog signal including a second number of having continuous values within a second specified range analog signals, the circuit producing a negated implication analog logic signal at said circuit output in response to said first and second composite analog signals.

2. The circuit of claim 1 wherein said first and second composite analog signals are analog current signals.

3. The circuit of claim 1 wherein said first and second diodes form at least a portion of an integrated circuit.

4. The circuit of claim 1 wherein said first and second diodes are each schottky diodes.

5. The circuit of claim 1 wherein said first number of continuously variable analog signals is equal to said second number of continuously variable analog signals.

6. A negated implication analog logic circuit comprising:
   a first diode having an anode adapted to receive a first number of having continuous values within a first specified range analog signals, and a cathode; and
   a second diode having an anode connected to said cathode of said first diode and defining a circuit output thereat, and a cathode adapted to receive a second number of analog signals having continuous values within a second specified range;
   wherein the circuit is responsive to said first and second numbers of continuously variable analog signals to produce a negated implication analog logic signal at said circuit output.

7. The circuit of claim 6 wherein said first and second composite analog signals are analog current signals.

8. The circuit of claim 6 wherein said first and second diodes form at least a portion of an integrated circuit.

9. The circuit of claim 6 wherein said first and second diodes are each schottky diodes.

10. The circuit of claim 6 wherein said first number of continuously variable analog signals is equal to said second number of continuously variable analog signals.

\* \* \* \* \*

UNITED STATES PATENT AND TRADEMARK OFFICE
CERTIFICATE OF CORRECTION

PATENT NO. : 5,917,338

DATED : June 29, 1999

INVENTOR(S) : Jonathan W. Mills

It is certified that error appears in the above-identified patent and that said Letters Patent is hereby corrected as shown below:

Col. 1, line 52
      replace " o "
    with --⊃--
    Col. 8, table 1, line 39
      replace " L9 "
    with -- £L9--

Signed and Sealed this

Fourth Day of January, 2000

Attest:

Attesting Officer

*Acting Commissioner of Patents and Trademarks*